United States Patent
Lee et al.

(10) Patent No.: US 12,387,706 B2
(45) Date of Patent: Aug. 12, 2025

(54) LIGHT-ACTIVATED ACOUSTIC RESONATOR AND ASSOCIATED METHODS

(71) Applicant: Toyota Motor Engineering & Manufacturing North America, Inc., Plano, TX (US)

(72) Inventors: Taehwa Lee, Ann Arbor, MI (US); Xiaopeng Li, Ann Arbor, MI (US); Ziqi Yu, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 359 days.

(21) Appl. No.: 18/113,341

(22) Filed: Feb. 23, 2023

(65) Prior Publication Data
US 2024/0290314 A1    Aug. 29, 2024

(51) Int. Cl.
*G01J 1/42* (2006.01)
*G10K 11/172* (2006.01)

(52) U.S. Cl.
CPC .......... *G10K 11/172* (2013.01); *G01J 1/4204* (2013.01)

(58) Field of Classification Search
CPC ............................ G10K 11/172; G01J 1/4204
See application file for complete search history.

(56) References Cited

U.S. PATENT DOCUMENTS 6,792,907 B1 * 9/2004 Kostun .................. F01N 1/065
                                                          123/184.57
7,757,808 B1 * 7/2010 Vaz ..................... F02M 35/1272
                                                              181/241
9,950,886 B2    4/2018 Shimazu et al.

FOREIGN PATENT DOCUMENTS

JP        2019075562 A    9/2022

OTHER PUBLICATIONS

J. Kuhn, P. Vogt (Ed.), Smartphones as Mobile Minilabs in Physics, Springer, 2017, found at https://www.researchgate.net/profile/Arturo-Marti/publication/364921924_Smartphones_as_Mobile_Minilabs_in_Physics_eBook/links/635e92216e0d367d91de4eb7/Smartphones-as-Mobile-Minilabs-in-Physics-eBook.pdf#p. 339.
D. Mandal et al., Surface Acoustic Wave (SAW) Sensors: Physics, Materials, and Applications, Sensors, MDPI, 2022, found at https://www.mdpi.com/1424-8220/22/3/820/pdf.

* cited by examiner

*Primary Examiner* — Tony Ko
(74) *Attorney, Agent, or Firm* — Christopher G. Darrow; Darrow Mustafa PC

(57) ABSTRACT

A light-activated acoustic resonator and associated methods are described herein. One embodiment measures the level of ambient light in the environment of the light-activated acoustic resonator; causes a moveable member of an electromagnet disposed within a Helmholtz resonator of the light-activated acoustic resonator to be in an extended position that places the Helmholtz resonator in a first acoustic state, when the level of ambient light is less than a predetermined amount; and causes the moveable member to be in a retracted position that places the Helmholtz resonator in a second acoustic state different from the first acoustic state, when the level of ambient light is at least the predetermined amount.

20 Claims, 4 Drawing Sheets

LIGHT-ACTIVATED ACOUSTIC RESONATOR AND ASSOCIATED METHODS

TECHNICAL FIELD

The subject matter described herein relates in general to acoustic resonators and, more specifically, to a light-activated acoustic resonator and associated methods.

BACKGROUND

Acoustic resonators such as Helmholtz resonators are used in a variety of applications involving the amplification or attenuation of sound. For example, musical instruments such as guitars, violins, flutes, and ocarinas include a Helmholtz resonator for sound amplification. Helmholtz resonators are also used in architectural acoustics to attenuate undesirable sounds. The ways in which the acoustic properties of conventional acoustic resonators can be adjusted or controlled are limited.

SUMMARY

Embodiments of a light-activated acoustic resonator are presented herein. In one embodiment, the light-activated acoustic resonator comprises a Helmholtz resonator and an electromagnet disposed within the Helmholtz resonator. The light-activated acoustic resonator also includes a light-activation circuit that causes a moveable member of the electromagnet to be in an extended position that places the Helmholtz resonator in a first acoustic state, when the light-activation circuit detects less than a predetermined amount of ambient light, and causes the moveable member to be in a retracted position that places the Helmholtz resonator in a second acoustic state different from the first acoustic state, when the light-activation circuit detects at least the predetermined amount of ambient light.

Another embodiment is a method of controlling a light-activated acoustic resonator, the method comprising measuring the level of ambient light in the environment of a light-activated acoustic resonator. The method also includes causing a moveable member of an electromagnet disposed within a Helmholtz resonator of the light-activated acoustic resonator to be in an extended position that places the Helmholtz resonator in a first acoustic state, when the level of ambient light is less than a predetermined amount. The method also includes causing the moveable member to be in a retracted position that places the Helmholtz resonator in a second acoustic state different from the first acoustic state, when the level of ambient light is at least the predetermined amount.

In another embodiment, the light-activated acoustic resonator comprises a Helmholtz resonator and a push-pull solenoid disposed within the Helmholtz resonator. The light-activated acoustic resonator also includes a light-activation circuit that causes a moveable member of the push-pull solenoid to be in a push position that places the Helmholtz resonator in a first acoustic state, when the light-activation circuit detects less than a predetermined amount of ambient light, and causes the moveable member to be in a pull position that places the Helmholtz resonator in a second acoustic state different from the first acoustic state, when the light-activation circuit detects at least the predetermined amount of ambient light.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

The acoustic properties of conventional acoustic resonators such as Helmholtz resonators are typically controlled using a stimulus such as a mechanical disturbance or electronic control. In some applications, it is advantageous to control the acoustic properties of an acoustic resonator using light as the stimulus. Various embodiments of a light-activated acoustic resonator and associated methods are described herein. For example, in one embodiment, light is used to control whether a Helmholtz resonator is capable of acoustically resonating. In another embodiment, light is used to control whether a Helmholtz resonator has a resonance frequency $f_1$ or a different resonance frequency $f_2$. A light-activated acoustic resonator can be used in a variety of applications, including, without limitation, controlling the propagation of sound through an acoustic duct using light as the stimulus. Light-activated acoustic resonators can also be used in light-activated/controlled human-machine interfaces (HMIs).

Figure 1A:
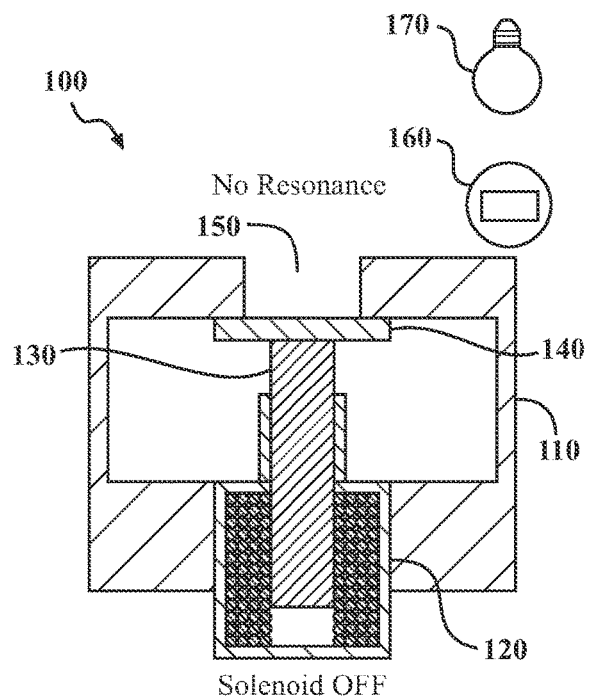
FIGS. 1A and 1B illustrate a light-activated acoustic resonator in each of two acoustic states, a non-resonant state and a resonant state, respectively, in accordance with an illustrative embodiment of the invention.
Figure 1B:
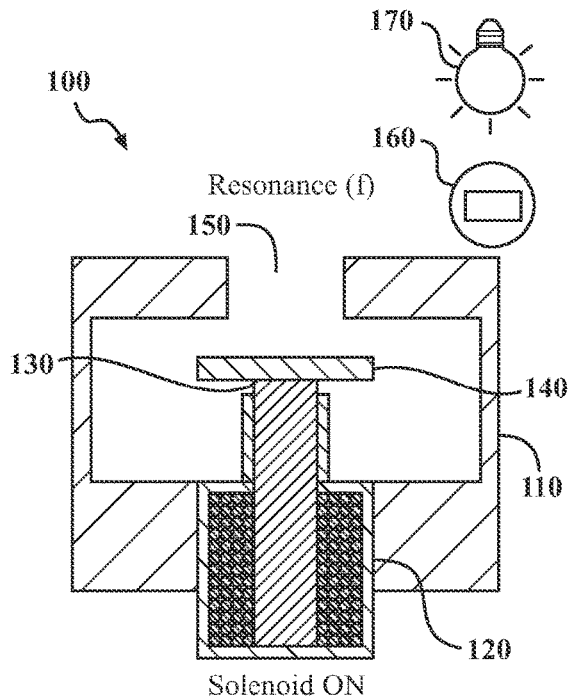

FIGS. 1A and 1B illustrate a light-activated acoustic resonator 100 in each of two acoustic states, a non-resonant state and a resonant state, respectively, in accordance with an illustrative embodiment of the invention. The views shown in FIGS. 1A and 1B are cross-sectional side views.

As shown in FIG. 1A, light-activated acoustic resonator 100 includes a Helmholtz resonator 110 within which a push-pull solenoid 120, a type of electromagnet, is disposed.

In other embodiments, a different type of electromagnet can be employed. Push-pull solenoid 120 includes a moveable member 130 that can assume an extended ("push") position, as illustrated in FIG. 1A. As shown in FIG. 1A, moveable member 130 has an attached plate 140 of sufficient width to close the opening 150 (also sometimes called the "neck") of the Helmholtz resonator 110, when the moveable member 130 is in the extended or push position. While in this first acoustic state, the Helmholtz resonator 110 has no acoustic resonance (i.e., it is unable to acoustically resonate because the opening 150 is closed).

As explained in greater detail below, light-activated acoustic resonator 100 includes a photosensor 160. When the photosensor 160 detects less than a predetermined amount of ambient light from a light source 170 in the environment of the light-activated acoustic resonator 100 (e.g., when the light source 170 is turned off or dimmed), a light-activation circuit (not shown in FIG. 1A) of the light-activated acoustic resonator 100 causes moveable member 130 to assume the extended or push position, as shown in FIG. 1A, acoustically deactivating the Helmholtz resonator 110.

As shown in FIG. 1B, when the photosensor 160 detects at least the predetermined amount of ambient light mentioned above (e.g., when the light source 170 is turned on and not dimmed), the light-activation circuit (not shown in FIG. 1B) causes the moveable member 130 of push-pull solenoid 120 to assume a retracted ("pull") position that fully opens the opening 150 of Helmholtz resonator 110. In general, the ambient light can come from one or more light sources 170 (e.g., incandescent light, LED light, fluorescent light, halogen light, sunlight, etc.). While in the second acoustic state, Helmholtz resonator 110 can resonate at a predetermined acoustic frequency f. Thus, when the light source 170 is turned on and not dimmed, the Helmholtz resonator 110 is acoustically activated (permitted to acoustically resonate).

Figure 2A:
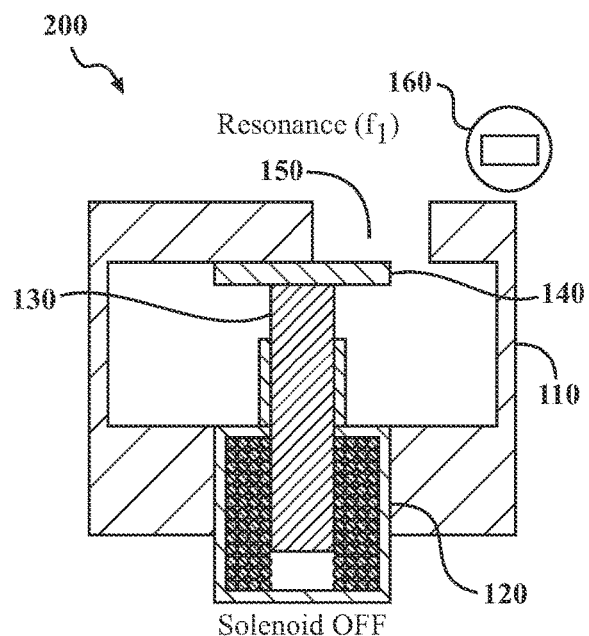
FIGS. 2A and 2B illustrate a light-activated acoustic resonator in each of two acoustic states, a first resonant state having a resonant frequency $f_1$ and a second resonant state having a resonant frequency $f_2$, respectively, in accordance with another illustrative embodiment of the invention.
Figure 2B:
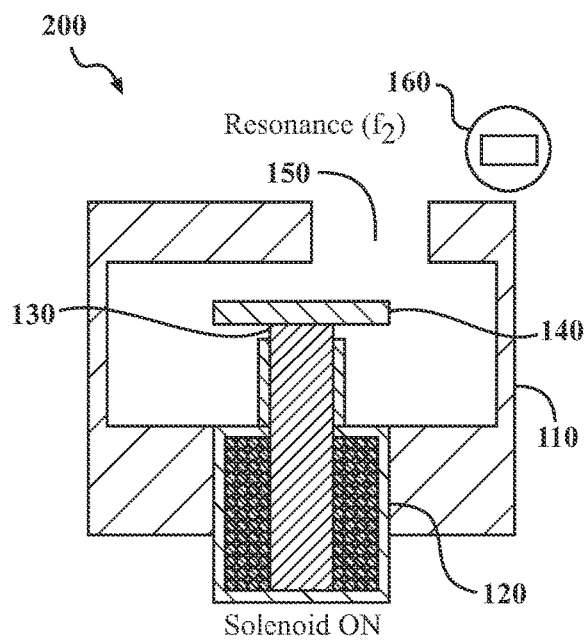

FIGS. 2A and 2B illustrate a light-activated acoustic resonator 200 in each of two acoustic states, a first resonant state having a resonant frequency $f_1$ and a second resonant state having a resonant frequency $f_2$, respectively, in accordance with another illustrative embodiment of the invention. In the embodiment of FIGS. 2A and 2B, the manner in which the acoustic state of Helmholtz resonator 110 is controlled via photosensor 160 and a light-activation circuit is similar to that discussed above in connection with FIGS. 1A and 1B, but push-pull solenoid 120 is offset somewhat relative to the opening 150 of Helmholtz resonator 110. In this embodiment, the first acoustic state of Helmholtz resonator 110 is one in which the opening 150 is partially closed, when the moveable member 130 is in the extended or push position (light source 170 off or dimmed). In this first acoustic state, Helmholtz resonator 110 resonates at a first predetermined acoustic frequency $f_1$. The second acoustic state of Helmholtz resonator 110 is one in which the opening 150 is fully open, when the moveable member 130 is in the retracted or pull position (light source 170 on and not dimmed). In this second acoustic state, Helmholtz resonator 110 resonates at a second predetermined acoustic frequency $f_2$. Thus, light-activated acoustic resonator 200 can be controlled to resonate at $f_1$ or $f_2$ (two different acoustic frequencies) using light as the stimulus.

For purposes of this Detailed Description, the moveable member 130 of the electromagnet (e.g., push-pull solenoid 120) is either in the extended position or the retracted position. Moveable member 130 switches between the two positions under control of the light-activation circuit discussed in greater detail in connection with FIG. 3.

Figure 3:
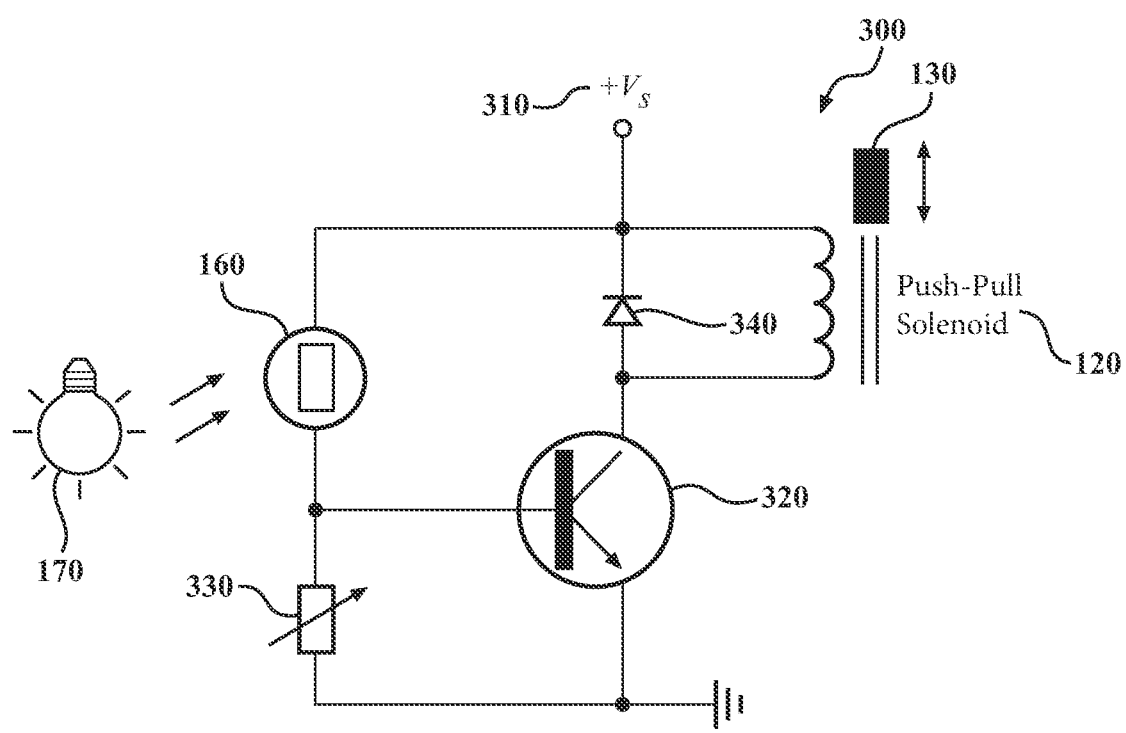
FIG. 3 is a schematic diagram of a light-activation circuit for a light-activated acoustic resonator, in accordance with an illustrative embodiment of the invention.

FIG. 3 is a schematic diagram of a light-activation circuit 300 for a light-activated acoustic resonator, in accordance with an illustrative embodiment of the invention. The light-activation circuit 300 shown in FIG. 3 can be employed in the embodiment discussed above in connection with FIGS. 1A and 1B or the embodiment discussed above in connection with FIGS. 2A and 2B.

As shown in FIG. 3, light-activation circuit 300 includes a voltage source 310, a NPN transistor 320, a variable resistor 330, a photosensor 160 (e.g., a photoresistor), and a diode 340. When the resistance of the photosensor (photoresistor) 160 becomes smaller than the resistance of variable resistor 330 due to light source 170 being on and not dimmed, as discussed above, voltage is applied to the push-pull solenoid 120, causing the moveable member 130 of push-pull solenoid 120 to assume the retracted or pull position. When light source 170 is off or dimmed, the resistance of photosensor (photoresistor) 160 is greater than that of variable resistor 330, so no voltage is applied to push-pull solenoid 120, causing the moveable member 130 of push-pull solenoid 120 to assume the extended or push position.

Figure 4A:
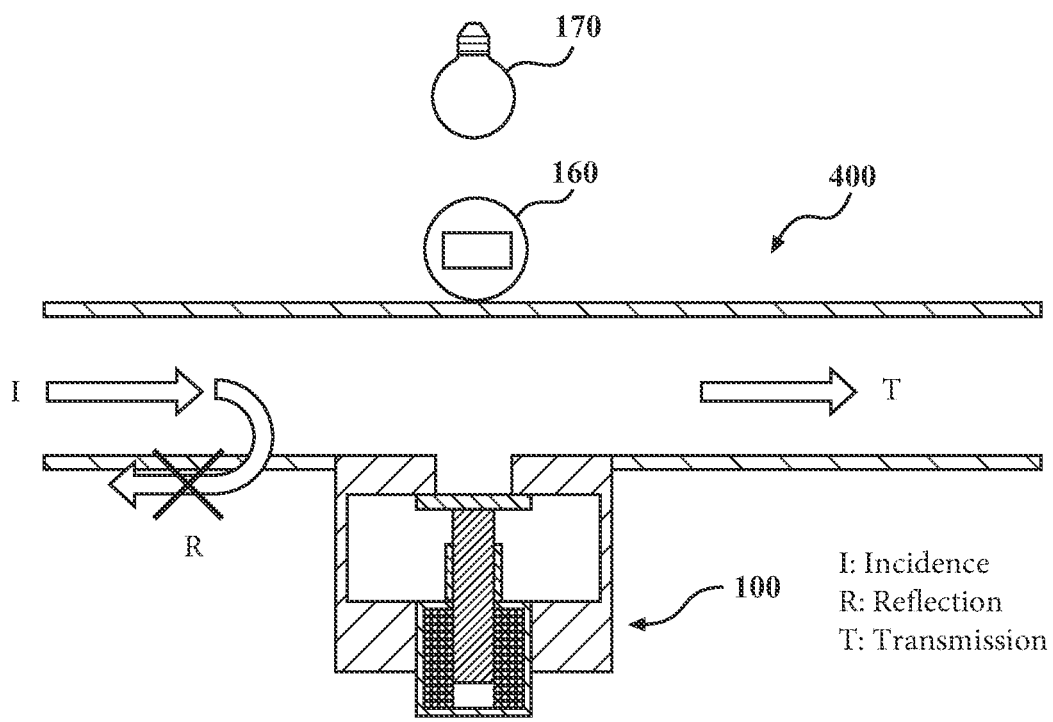
FIGS. 4A and 4B illustrate a light-activated acoustic resonator deployed in an acoustic duct in each of two acoustic states, a non-resonant state that permits an acoustic wave to propagate along the acoustic duct and a resonant state that prevents an acoustic wave from propagating along the acoustic duct, respectively, in accordance with an illustrative embodiment of the invention.
Figure 4B:
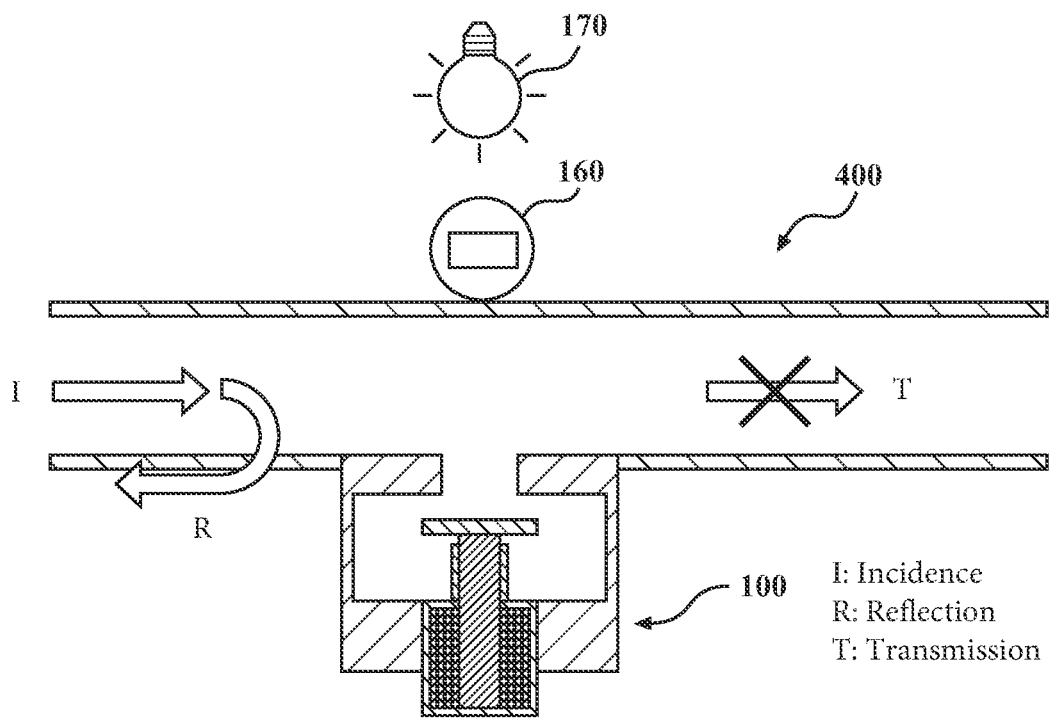

FIGS. 4A and 4B illustrate a light-activated acoustic resonator 100 deployed in an acoustic duct 400 in each of two acoustic states, a non-resonant state that permits an acoustic wave to propagate along the acoustic duct 400 and a resonant state that prevents an acoustic wave from propagating along the acoustic duct 400, respectively, in accordance with an illustrative embodiment of the invention. FIGS. 4A and 4B illustrate an application of the light-activated acoustic resonator 100 discussed above in connection with FIGS. 1A and 1B. This application may be termed "acoustic wave switching."

As indicated in FIG. 4A, when light source 170 is off or dimmed, light-activated acoustic resonator 100 is deactivated (i.e., its Helmholtz resonator 110 is in the first (non-resonant) acoustic state discussed above in connection with FIG. 1A). This arrangement permits an acoustic wave of a relevant frequency to propagate along the acoustic duct 400. This condition corresponds to the "transmission" (T) of the acoustic wave indicated in FIG. 4A.

As indicated in FIG. 4B, when light source 170 is on and not dimmed, light-activated acoustic resonator 100 is activated (i.e., its Helmholtz resonator 110 is in the second (resonant) acoustic state discussed above in connection with FIG. 1B). This arrangement blocks (prevents) an acoustic wave of the relevant frequency from propagating along the acoustic duct 400. This condition corresponds to the "reflection" (R) of the acoustic wave indicated in FIG. 4B.

Figure 5:
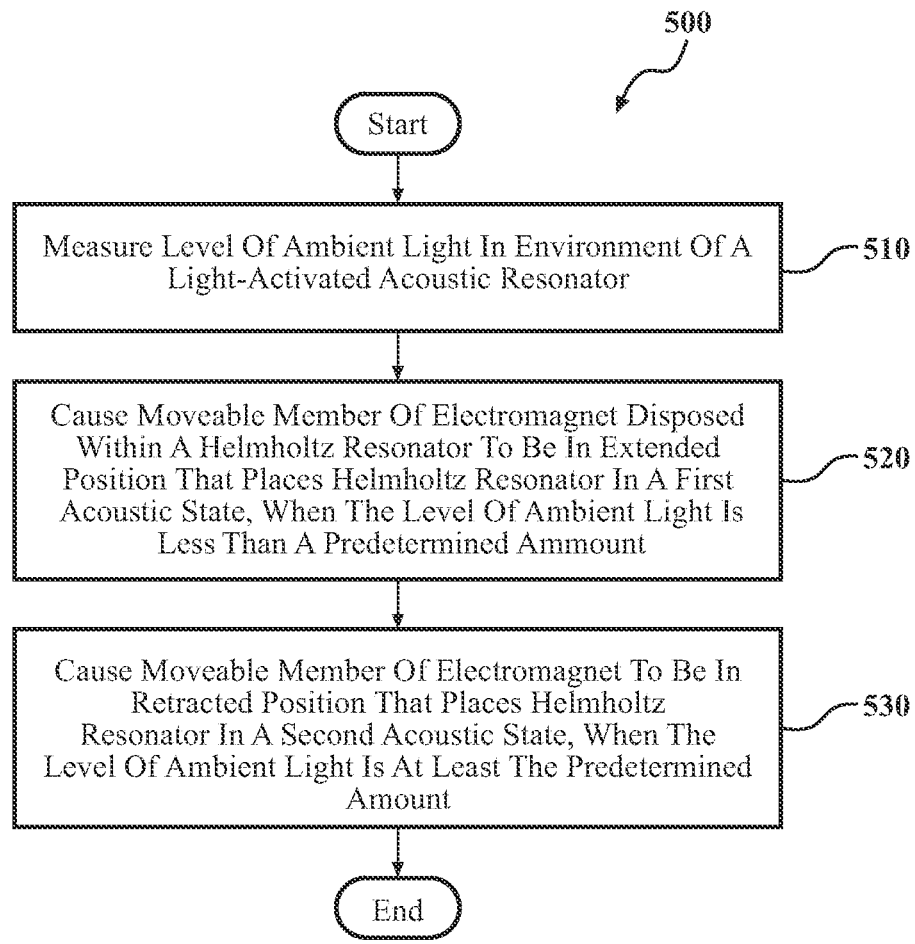
FIG. 5 is a flowchart of a method of controlling a light-activated acoustic resonator, in accordance with an illustrative embodiment of the invention.

FIG. 5 is a flowchart of a method 500 of controlling a light-activated acoustic resonator, in accordance with an illustrative embodiment of the invention. Method 500 will be discussed from the perspective of light-activated acoustic resonator 100 in FIG. 1A or 1B and light-activated acoustic resonator 200 in FIGS. 2A and 2B (method 500 applies to both embodiments). While method 500 is discussed in combination with light-activated acoustic resonator 100 or light-activated acoustic resonator 200, it should be appreciated that method 500 is not limited to being implemented within light-activated acoustic resonator 100 or light-activated acoustic resonator 200, but light-activated acoustic resonator 100 and light-activated acoustic resonator 200 are instead examples of systems/apparatuses that can implement method 500.

At block 510, photosensor 160 of light-activation circuit 300 measures the level of ambient light in the environment of a light-activated acoustic resonator 100 or 200. As explained above, the light can come from one or more light sources 170 (e.g., incandescent light, LED light, fluorescent light, halogen light, sunlight, etc.). In some embodiments, photosensor 160 is a photoresistor, as discussed above in connection with FIG. 3. In such an embodiment, the resistance of the photoresistor is indicative of the level of ambient light reaching the photoresistor. For example, in one embodiment the resistance of the photoresistor decreases, when a light source 170 is turned on and not dimmed, relative to when the light source 170 is turned off or dimmed. This is discussed in further detail in connection with FIG. 3 above.

At block 520, the light-activation circuit 300 causes the moveable member 130 of an electromagnet (e.g., a push-pull solenoid 120) disposed within a Helmholtz resonator 110 of the light-activated acoustic resonator 100 or 200 to be in an extended position that places the Helmholtz resonator 110 in a first acoustic state, when the level of ambient light is less than a predetermined amount. As discussed above, in the embodiment of FIGS. 1A and 1B (light-activated acoustic resonator 100), while Helmholtz resonator 110 is in the first acoustic state, Helmholtz resonator 110 has no acoustic resonance (i.e., it is unable to acoustically resonate because the opening 150 is closed by the extended moveable member 130). As also discussed above, in the embodiment of FIGS. 2A and 2B (light-activated acoustic resonator 200), while Helmholtz resonator 110 is in the first acoustic state, the opening 150 is partially closed because the moveable member 130 is in the extended position, and Helmholtz resonator 110 resonates at a first predetermined acoustic frequency $f_1$.

At block 530, the light-activation circuit 300 causes the moveable member 130 to be in a retracted position that places the Helmholtz resonator 110 in a second acoustic state different from the first acoustic state, when the level of ambient light is at least the predetermined amount. As discussed above, in the embodiment of FIGS. 1A and 1B (light-activated acoustic resonator 100), while Helmholtz resonator 110 is in the second acoustic state, Helmholtz resonator 110 can resonate at a predetermined acoustic frequency f. As also discussed above, in the embodiment of FIGS. 2A and 2B (light-activated acoustic resonator 200), while Helmholtz resonator 110 is in the second acoustic state, the opening 150 is fully open because moveable member 130 is in the retracted position, and Helmholtz resonator 110 resonates at a second predetermined acoustic frequency $f_2$. In the embodiment of FIGS. 2A and 2B (light-activated acoustic resonator 200), the resonance frequencies $f_1$ and $f_2$ are distinct, as discussed above.

As discussed above, in some embodiments, the electromagnet of the light-activated acoustic resonator 100 or light-activated acoustic resonator 200 is a push-pull solenoid 120. In those embodiments, the extended position of the moveable member 130 corresponds to the "push" state of the push-pull solenoid 120, and the retracted position of the moveable member 130 corresponds to the "pull" state of the push-pull solenoid 120. As discussed above, for purposes of this Detailed Description, the moveable member 130 of the electromagnet is either in the extended position or the retracted position, and light-activation circuit 300 controls the position of moveable member 130.

As discussed above, the various embodiments of a light-activated acoustic resonator described herein can be used in a variety of applications, including, without limitation, controlling the propagation of sound through an acoustic duct 400 using light as the stimulus (see the discussion of FIGS. 4A and 4B above). Light-activated acoustic resonators can also be used in light-activated/controlled HMIs.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1A-5, but the embodiments are not limited to the illustrated structure or application.

The components described above can be realized in hardware or a combination of hardware and software and can be realized in a centralized fashion in one processing system or in a distributed fashion where different elements are spread across several interconnected processing systems. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality." as used herein, is defined as two or more than two. The term "another." as used herein, is defined as at least a second or more. The terms "including" and/or "having." as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

As used herein, "cause" or "causing" means to make, command, instruct, and/or enable an event or action to occur or at least be in a state where such event or action may occur, either in a direct or indirect manner.

Aspects herein can be embodied in other forms without departing from the spirit or essential attributes thereof. Accordingly, reference should be made to the following claims rather than to the foregoing specification, as indicating the scope hereof.

What is claimed is:

1. A light-activated acoustic resonator, comprising:
a Helmholtz resonator;
an electromagnet disposed within the Helmholtz resonator; and
a light-activation circuit that:
   causes a moveable member of the electromagnet to be in an extended position that places the Helmholtz resonator in a first acoustic state, when the light-activation circuit detects less than a predetermined amount of ambient light; and
   causes the moveable member to be in a retracted position that places the Helmholtz resonator in a second acoustic state different from the first acoustic state, when the light-activation circuit detects at least the predetermined amount of ambient light.

2. The light-activated acoustic resonator of claim 1, wherein the moveable member, while in the extended position, closes an opening of the Helmholtz resonator and the Helmholtz resonator, while in the first acoustic state, is prevented from acoustically resonating.

3. The light-activated acoustic resonator of claim 1, wherein the moveable member, while in the retracted position, opens an opening of the Helmholtz resonator and the Helmholtz resonator, while in the second acoustic state, resonates at a predetermined acoustic frequency.

4. The light-activated acoustic resonator of claim 1, wherein the moveable member, while in the extended position, partially closes an opening of the Helmholtz resonator and the Helmholtz resonator, while in the first acoustic state, resonates at a first predetermined acoustic frequency $f_1$.

5. The light-activated acoustic resonator of claim 1, wherein the moveable member, while in the retracted position, fully opens an opening of the Helmholtz resonator and the Helmholtz resonator, while in the second acoustic state, resonates at a second predetermined acoustic frequency $f_2$.

6. The light-activated acoustic resonator of claim 1, wherein the electromagnet is a push-pull solenoid.

7. The light-activated acoustic resonator of claim 6, wherein the extended position corresponds to a push state of the push-pull solenoid.

8. The light-activated acoustic resonator of claim 6, wherein the retracted position corresponds to a pull state of the push-pull solenoid.

9. A method, comprising:
measuring a level of ambient light in an environment of a light-activated acoustic resonator;
causing a moveable member of an electromagnet disposed within a Helmholtz resonator of the light-activated acoustic resonator to be in an extended position that places the Helmholtz resonator in a first acoustic state, when the level of ambient light is less than a predetermined amount; and
causing the moveable member to be in a retracted position that places the Helmholtz resonator in a second acoustic state different from the first acoustic state, when the level of ambient light is at least the predetermined amount.

10. The method of claim 9, wherein the moveable member, while in the extended position, closes an opening of the Helmholtz resonator and the Helmholtz resonator, while in the first acoustic state, is prevented from acoustically resonating.

11. The method of claim 9, wherein the moveable member, while in the retracted position, opens an opening of the Helmholtz resonator and the Helmholtz resonator, while in the second acoustic state, resonates at a predetermined acoustic frequency.

12. The method of claim 9, wherein the moveable member, while in the extended position, partially closes an opening of the Helmholtz resonator and the Helmholtz resonator, while in the first acoustic state, resonates at a first predetermined acoustic frequency $f_1$.

13. The method of claim 9, wherein the moveable member, while in the retracted position, fully opens an opening of the Helmholtz resonator and the Helmholtz resonator, while in the second acoustic state, resonates at a second predetermined acoustic frequency $f_2$.

14. The method of claim 9, wherein the electromagnet is a push-pull solenoid.

15. The method of claim 14, wherein the extended position corresponds to a push state of the push-pull solenoid.

16. The method of claim 14, wherein the retracted position corresponds to a pull state of the push-pull solenoid.

17. A light-activated acoustic resonator, comprising:
a Helmholtz resonator;
a push-pull solenoid disposed within the Helmholtz resonator; and
a light-activation circuit that:
  causes a moveable member of the push-pull solenoid to be in a push position that places the Helmholtz resonator in a first acoustic state, when the light-activation circuit detects less than a predetermined amount of ambient light; and
  causes the moveable member to be in a pull position that places the Helmholtz resonator in a second acoustic state different from the first acoustic state, when the light-activation circuit detects at least the predetermined amount of ambient light.

18. The light-activated acoustic resonator of claim 17, wherein the moveable member, while in the push position, closes an opening of the Helmholtz resonator and the Helmholtz resonator, while in the first acoustic state, is prevented from acoustically resonating.

19. The light-activated acoustic resonator of claim 17, wherein the moveable member, while in the pull position, opens an opening of the Helmholtz resonator and the Helmholtz resonator, while in the second acoustic state, resonates at a predetermined acoustic frequency.

20. The light-activated acoustic resonator of claim 17, wherein:
  the moveable member, while in the push position, partially closes an opening of the Helmholtz resonator and the Helmholtz resonator, while in the first acoustic state, resonates at a first predetermined acoustic frequency $f_1$; and
  the moveable member, while in the pull position, fully opens the opening of the Helmholtz resonator and the Helmholtz resonator, while in the second acoustic state, resonates at a second predetermined acoustic frequency $f_2$.

* * * * *